(12) United States Patent
Huo et al.

(10) Patent No.: US 8,861,886 B2
(45) Date of Patent: Oct. 14, 2014

(54) ENHANCED VISUALIZATION FOR MEDICAL IMAGES

(75) Inventors: Zhimin Huo, Pittsford, NY (US); Zhiqiang Lao, Newton, PA (US); Fan Xu, Shanghai (CN)

(73) Assignee: Carestream Health, Inc., Rochester, NY (US)

( * ) Notice: Subject to any disclaimer, the term of this patent is extended or adjusted under 35 U.S.C. 154(b) by 578 days.

(21) Appl. No.: 13/086,487

(22) Filed: Apr. 14, 2011

(65) Prior Publication Data

US 2012/0263366 A1 Oct. 18, 2012

(51) Int. Cl.
*G06K 9/00* (2006.01)
*G06K 9/40* (2006.01)
*G06T 5/40* (2006.01)
*G06T 5/00* (2006.01)

(52) U.S. Cl.
CPC . *G06T 5/009* (2013.01); *G06T 5/40* (2013.01); *G06T 2207/30061* (2013.01); *G06T 2207/10116* (2013.01)
USPC ............ 382/274; 382/100; 382/275; 382/254

(58) Field of Classification Search
None
See application file for complete search history.

(56) References Cited

U.S. PATENT DOCUMENTS

| | | | | |
|---|---|---|---|---|
| 5,668,888 A | * | 9/1997 | Doi et al. | 382/132 |
| 5,671,264 A | * | 9/1997 | Florent et al. | 378/98 |
| 5,715,334 A | * | 2/1998 | Peters | 382/254 |
| 6,136,541 A | * | 10/2000 | Gulati | 435/6.12 |
| 6,681,054 B1 | * | 1/2004 | Gindele | 382/272 |
| 6,782,137 B1 | * | 8/2004 | Avinash | 382/254 |
| 7,400,758 B2 | * | 7/2008 | Shi et al. | 382/132 |
| 2005/0100208 A1 | | 5/2005 | Suzuki et al. | |
| 2008/0317322 A1 | * | 12/2008 | Acharyya et al. | 382/132 |
| 2010/0067772 A1 | * | 3/2010 | Kitamura | 382/132 |
| 2011/0206261 A1 | * | 8/2011 | Huo et al. | 382/132 |

OTHER PUBLICATIONS

Zimmerman et al, "A Psychophysical Comparison of Two Methods Adaptive Histograms Equalization", *Journal of Digital Imaging*, vol. 2, No. 2, May, 1989, pp. 82-91.
Rehm et al. "Artifact Suppression in Digital Chest Radiographs Enhanced with Adaptive Histogram Equalization", *SPIE vol. 1092 Medical Imaging III:Image Processing (1989)* pp. 290-300.

* cited by examiner

*Primary Examiner* — Avinash J Yentrapati

(57) ABSTRACT

A method for enhancing a radiographic image. The method includes obtaining image data for the radiographic image, generating conditioned image data by increasing differences between neighboring portions of at least a relatively uniform area of the radiographic image, generating an enhanced image by applying contrast limited adaptive histogram equalization to the conditioned image data, applying interpolation to the enhanced image, and displaying, storing, or transmitting the enhanced image.

19 Claims, 14 Drawing Sheets

ENHANCED VISUALIZATION FOR MEDICAL IMAGES

FIELD OF THE INVENTION

The invention relates generally to the field of diagnostic imaging and more particularly to methods for enhanced visualization of chest x-ray images for improving detectability of conditions such as pneumothorax.

BACKGROUND OF THE INVENTION

The chest x-ray is a useful diagnostic tool that assists in detecting a number of patient conditions and for imaging a range of skeletal and organ structures. In clinical applications such as in the Intensive Care Unit (ICU), the chest x-ray can have particular value for indicating pneumothorax as well as for tube/line positioning, and other clinical conditions. Pneumothorax is a condition caused by an accumulation of air or gas in the pleural cavity, which can occur as a result of disease or injury. Radiographic detection of pneumothorax is commonly based on observing a subtle, fine curved-line pattern in the apical lung region, a dark pleural air space against the chest wall due to increased transparency, and a lack of lung structure between the rib cage and the pneumothorax pattern. The radiologist can recognize the outer lung membrane in shadowy fashion in the chest image, as well as blood vessels that proceed from the middle of the lung toward the edge and end at the lung membrane.

Although pneumothoraces are clinically important abnormalities, it is often difficult to detect them in the radiographic image. Some of the problems that complicate pneumothorax detection are due to the location of this condition, since there can be some overlap between the pneumothorax region and nearby ribs and clavicle. Edge detection and rib removal routines, which can be helpful for allowing improved visibility of some types of conditions, can be detrimental to display of pneumothorax in many cases, since such routines can often mistake the boundary along which pneumothorax is detected as a type of edge and, deriving this inaccurate information from the image, incorrectly apply edge suppression. This may result in actually reducing the visibility of the pneumothorax condition. Because of this, and as a result of similar problems, it can be particularly difficult to detect pneumothorax using a computer-aided detection (CAD) system.

The advent of mobile X-ray imaging systems that can be wheeled up to the patient's bedside, such as in an ICU facility, makes it desirable to be able to enhance various conditions related to tissue such as pneumothorax or lung nodules, as well as to enhance tube and line contours in an obtained image. Where a condition such as pneumothorax is identified it can be further helpful, where possible, to report this condition automatically using image analysis utilities. The capability to provide this function would be valuable for improving patient care and response to patient condition. However, due to the complexity of the image analysis problem and due to the relative subtlety of its visual indications, pneumothorax detection and enhancement continue to present a problem that is elusive for conventional image processing and analysis approaches.

One approach to the particular problem of pneumothorax detection is presented in U.S. Pat. No. 5,668,888, entitled "Method and System for Automatic Detection of Ribs and Pneumothorax in Digital Chest Radiographs" (Doi).

Because of the diverse types of tissues and structures involved, the chest x-ray presents a number of challenges to conventional techniques for image enhancement. One set of problems for improving the detectability of pneumothorax as well as for detecting lung nodules or line and tube placement relates to imaging differences between lung tissue and tissues in the abdominal region. In many chest x-rays the abdominal region appears to be highly uniform when compared against other areas of the image. Because of this, image enhancement techniques that may work well over non-uniform regions of the image can tend to generate artifacts when applied over the more uniform region or when applied along the boundaries of the more uniform area.

Among contrast enhancement techniques of considerable promise are pre-processing techniques that perform histogram equalization (HE). Using such methods, a histogram is generated for the image, then a transform is applied in order to re-allocate histogram values to a more suitable range of values. While this works well with some types of images, however, histogram equalization is indiscriminate and can actually enhance the visibility of noise as well as the intended signal. This effect can be particularly noticeable in background areas, but also affects areas of diagnostic interest in the radiographic image.

Contrast Limited Adaptive Histogram Equalization (CLAHE) is an improvement upon conventional histogram equalization methods that uses the local neighborhood of the image pixel in order to enhance image contrast. In CLAHE processing, the image is effectively tiled into local regions. An adaptive contrast enhancement is then applied within each region. This involves generating and processing a local histogram for each region, then equalizing values within the region from a narrower range to a broader range of values. An interpolation process then smoothes out discontinuities in appearance between adjacent tiles.

CLAHE processing allows adjustment of variables such as histogram clipping, which effectively adjusts the contrast characteristic, and tile sizing, so that a suitably sized region is used for histogram equalization. When applied with a small amount of clipping and an appropriate tiling scheme, CLAHE processing can improve image contrast to some degree without over-enhancing noise content or introducing artifacts to the processed image. However, increased clipping may be needed in order to boost contrast when using CLAHE.

One artifact that often results from CLAHE pre-processing is ripple, a low-frequency imaging effect that is most visible over uniform areas of the image (such as the abdominal region), but also affects less uniform portions of the image. Where ripple occurs, there can be difficulty in detecting the edges of structures, such as those that show a pneumothorax condition, for example. Ripple can be reduced somewhat, by smoothing the image data. However, this type of solution can compromise image quality and reduce contrast, losing information and effectively defeating the processing for contrast enhancement that produced ripple in the first place. This ripple artifact is also referred to as a "ring artifact" or "boundary artifact" and is the artifact in homogeneous areas noted by Zimmerman et al, in an article entitled "A Psychophysical Comparison of Two Methods for Adaptive Histograms Equalization", Journal of Digital Imaging, Vol. 2, No. 2, May, 1989, pp. 82-91 and by Rehm et al. in an article entitled "Artifact Suppression in Digital Chest Radiographs Enhanced with Adaptive Histogram Equalization", SPIE Vol. 1092 Medical Imaging III: Image Processing (1989) pp. 290-300.

In some cases, the ripple artifact is only observed along the edge of the heart, mediastinum, rib cage and diaphragm. However, when a combination of a smaller tile size and/or higher clipping value is used, these boundary artifacts extend beyond these boundaries into relative uniform areas and become more obvious ripple patterns, such as those that appear in FIG. 1, which shows a chest X-ray having ripple artifacts.

Although these artifacts seem to appear only along areas close to boundaries, such as from low density lung area to high-density anatomy areas, the root cause of these artifacts appears to be due to an over-enhancement of regions that have relative uniform density. Various methods to remove or reduce these boundary artifacts have been proposed. Rehm et al., in the article noted earlier, proposed to reduce these artifacts by subtracting large structure background content to remove the density shift or high contrast at the boundary.

Other, more complex solutions for reducing ripple in the processed image include processes that adjust or modify the CLAHE processing scheme for individual tiles. However, if proper care is not given in selecting the clipping level or other CLAHE related variables, the difference in local contrast enhancement using such processing from one tile to another tile may have negative effects on image uniformity in terms of detail contrast. Achieving differences in detail contrast enhancement, such as blurring and losing contrast over areas with a lower detail contrast enhancement when compared to areas with higher contrast enhancement, can have negative effects. While this processing may reduce ripple somewhat, its results often fall short of diagnostic quality if a consistent detail contrast in an image is required.

Thus, it can be appreciated that there is a need for enhancement techniques for chest x-rays and other radiographic images, where such techniques enhance the visualization of both diagnostic and clinical conditions, without increasing noise content or introducing image artifacts, and offer improved robustness and accuracy over earlier methods.

SUMMARY OF THE INVENTION

An object of the present invention is to address the need for pneumothorax enhancement in chest x-ray images. A related object of the present invention is to provide a suitably enhanced image with local contrast enhancement for presenting pneumothorax more clearly.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the present invention, there is provided a method for enhancing a radiographic image, executed at least in part on a host processor and comprising: obtaining image data for the radiographic image; generating conditioned image data by increasing differences between neighboring portions of at least a relatively uniform area of the radiographic image; generating an enhanced image by applying contrast limited adaptive histogram equalization to the conditioned image data; applying interpolation to the enhanced image; and displaying the enhanced image.

According to another aspect of the present invention, there is provided a method for enhancing a radiographic image, executed at least in part on a host processor and comprising: obtaining image data for the radiographic image, wherein the image data values extend within a first range; generating conditioned image data by re-mapping at least a portion of the obtained image data values to a second range that is expanded over the first range; generating an enhanced image by applying contrast limited adaptive histogram equalization to the conditioned image data; and displaying the enhanced image.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
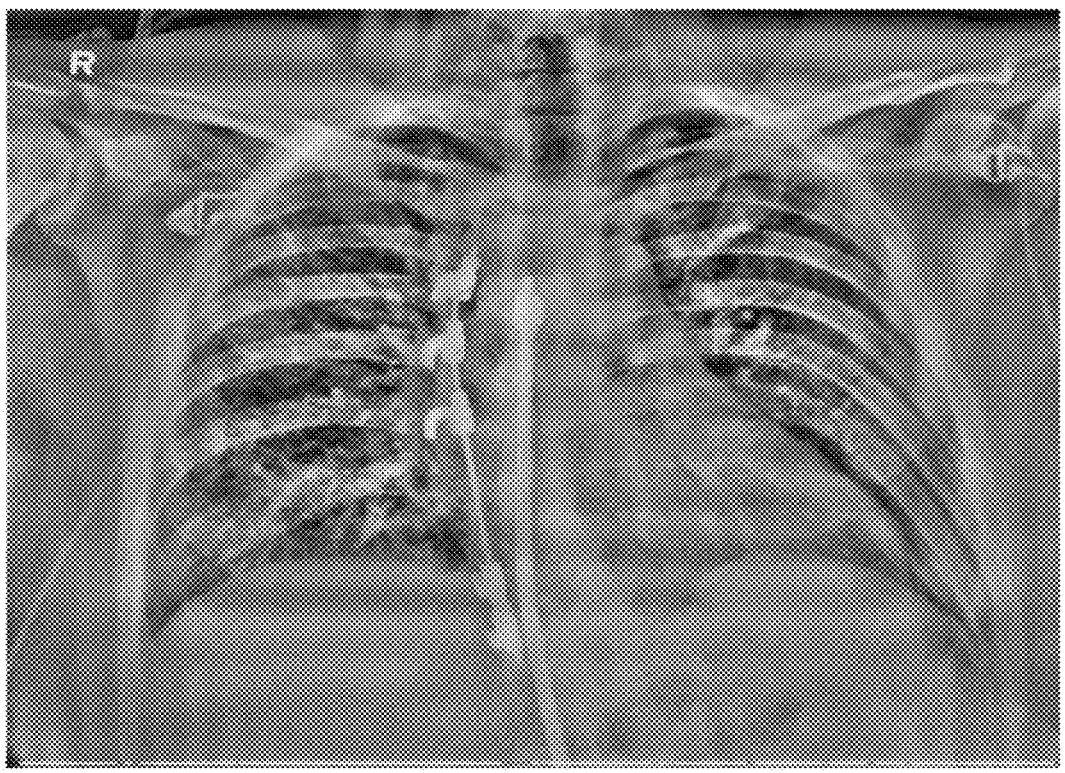
FIG. 1 shows a chest X-ray having ripple artifacts.

The following is a detailed description of the preferred embodiments of the invention, reference being made to the drawings in which the same reference numerals identify the same elements of structure in each of the several figures.

The method of the present invention executes on a computer or other type of control logic processor, which may include a dedicated microprocessor or similar device. A computer program product used in an embodiment of the present invention may include one or more storage media, for example; magnetic storage media such as magnetic disk or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

It is noted that the term "memory", equivalent to "computer-accessible memory" in the context of the present disclosure, can refer to any type of temporary or more enduring data storage workspace used for storing and operating upon image data and accessible to a computer system. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer is also considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

Embodiments of the present invention use digital image data of a patient or other subject for an X-ray image, such as a chest X-ray image. The image data can be obtained from any of a number of types of image recording media, such as from a Digital Radiography (DR) detector that generates digital image data directly from received radiation; or from a Computed Radiography (CR) detector that stores energy from the radiation and is scanned in order to generate the digital image data; or from a film scanner that acts as a part of an image detector and scans developed X-ray film to generate digital image data therefrom.

Figure 2:
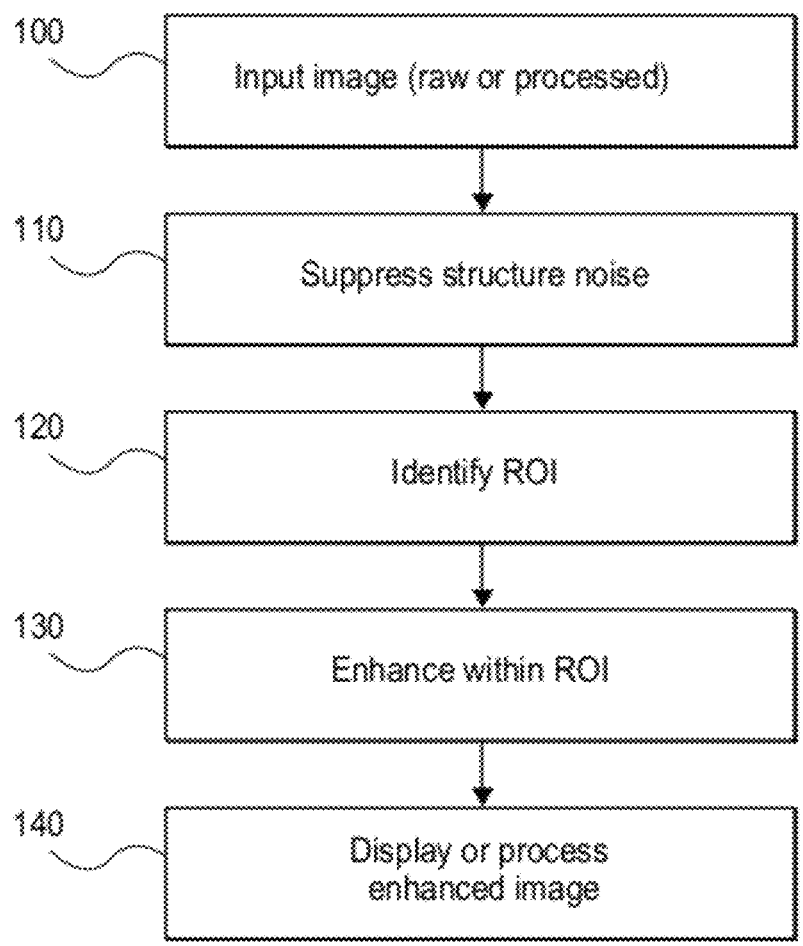
FIG. 2 shows a logic flow diagram with steps for obtaining an enhanced image that can be used for pneumothorax detection.

FIG. 2 shows a logic flow diagram for obtaining an enhanced image, such as an image usable for pneumothorax detection, for lung nodule detection, or for tube/line detection, for example. This method constrains its enhancement processing to a region of interest (ROI) of the image, leaving other portions of the original image untouched. In an input image step 100, image data for a chest x-ray is obtained. A structure noise suppression step 110 is then executed for suppressing structural content of the image that is considered to be "noise" with respect to detection of pneumothorax or other condition. Structure noise may include rib edges and various elements such as tubing and other lines and associated clips and hardware that may obscure the pneumothorax region. An ROI identification step 120 then identifies portions of the image content over which pneumothorax or other detectable condition occurs, such as the upper chest areas. An enhancement step 130 then provides local enhancement of ROI areas in order to increase the contrast so that pneumothorax or other condition is more visible. A results step 140 then either displays the enhanced image or provides the enhancement data for subsequent image analysis and processing. It should be noted that the described sequence can work well for image enhancement where more localized enhancement is desirable and includes some features, such as suppression of structure noise, that can be applied when any type of image enhancement strategy is followed. A drawback of the processing shown in FIG. 2 relates to ROI identification; this can require complex processing and can be subject to error or inaccuracy. Where operator input is used, this requires intervention by a skilled operator, which can delay processing. Further localized contrast enhancement can result in images with inconsistent overall image contrast. End users may prefer a consistent contrast over the entire image for the easy of comparison.

Figure 3:
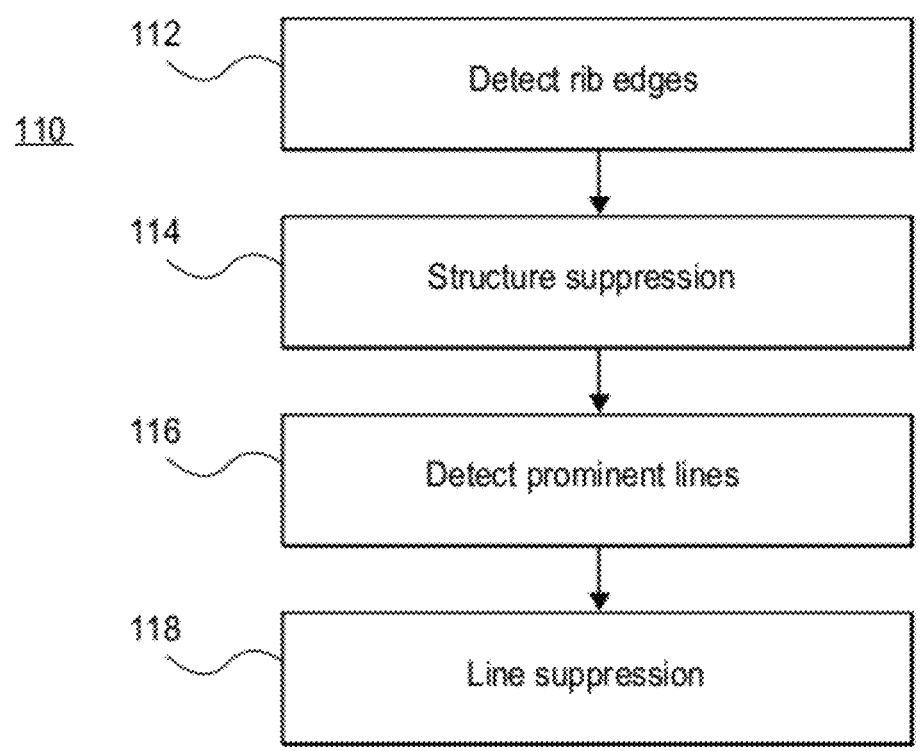
FIG. 3 shows a logic flow diagram with procedures for removing structure noise in order to provide the enhanced image.
Figure 4:
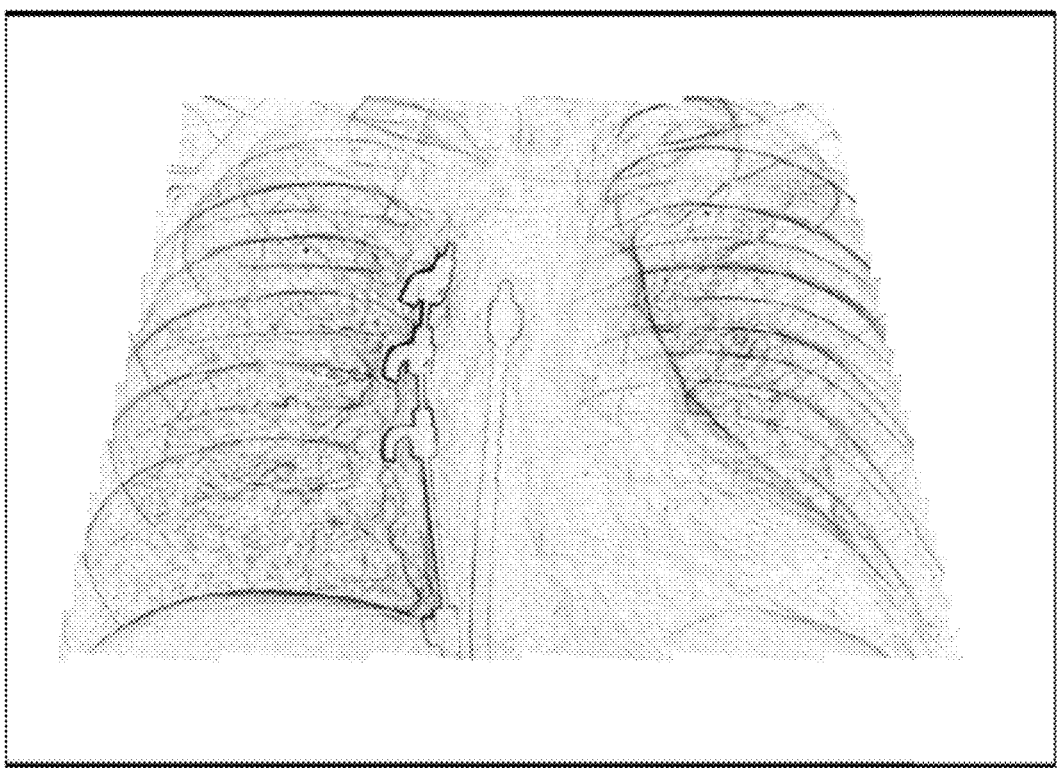
FIG. 4 shows an example with detection of rib edges and tube and line features.
Figure 5:
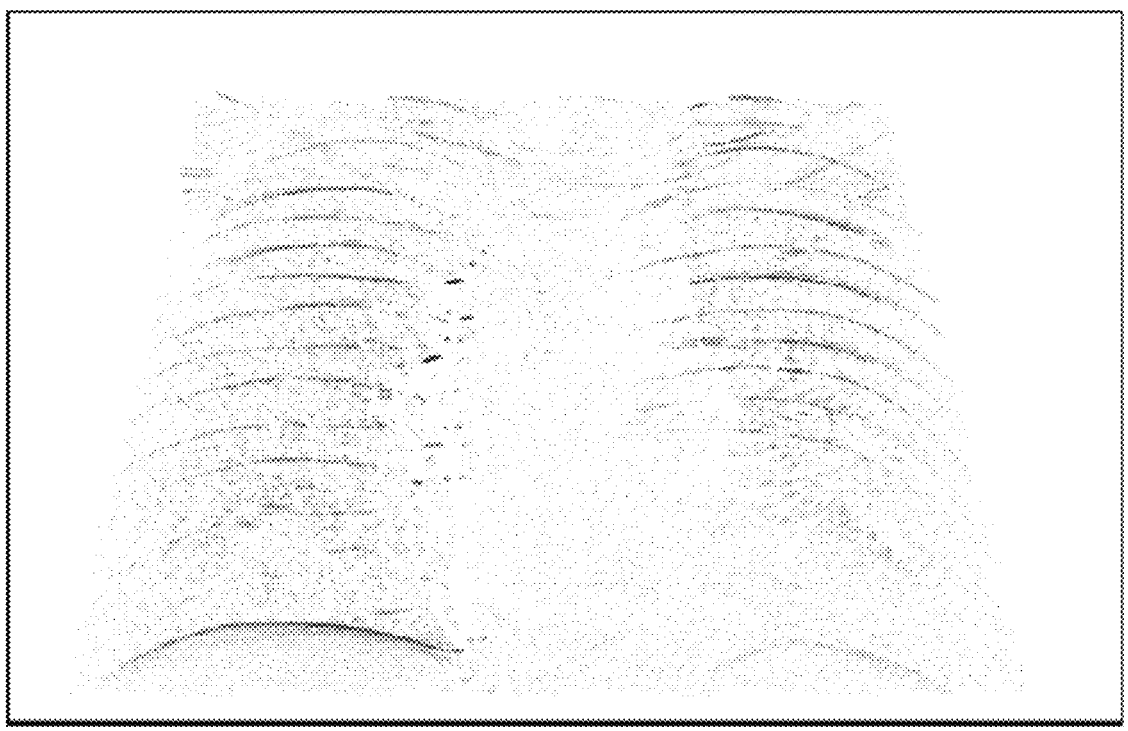
FIG. 5 shows an example with rib edge detection.

The logic flow diagram of FIG. 3 shows procedures for suppressing structure noise in order to provide the enhanced image. A rib edge detection step 112 processes the image to identify edges of rib structures, as shown in FIGS. 4 and 5. Rib edge detection techniques are known to those skilled in the diagnostic imaging arts. One example is the method described in U.S. Patent Application Number 2008/0317322 entitled "Identifying Ribs in Lung X-rays" by Acharyya et al. that uses a Canny edge detector algorithm. An optional structure suppression step 114 then uses statistical analysis to suppress the rib lines. In an alternate embodiment, the rib structure itself is suppressed. Rib suppression is described, for example, in U.S. Patent Application Publication No. 2005/0100208 entitled "Image Modification and Detection Using Massive Training Artificial Neural Networks (MTANN)" by Suzuki et al.

Continuing with the process shown in FIG. 2, a prominent line detection step 116 is executed for detection of tubes, wires, and related structures that can obscure visibility of the pneumothorax condition or other clinical or diagnostic condition of interest. A line suppression step 118 follows to compensate and correct for pixels that are part of a tube or line structure. FIG. 4 shows an example with detection of rib edges and tube and line features. FIG. 5 shows an example with rib edge detection.

Figure 6:
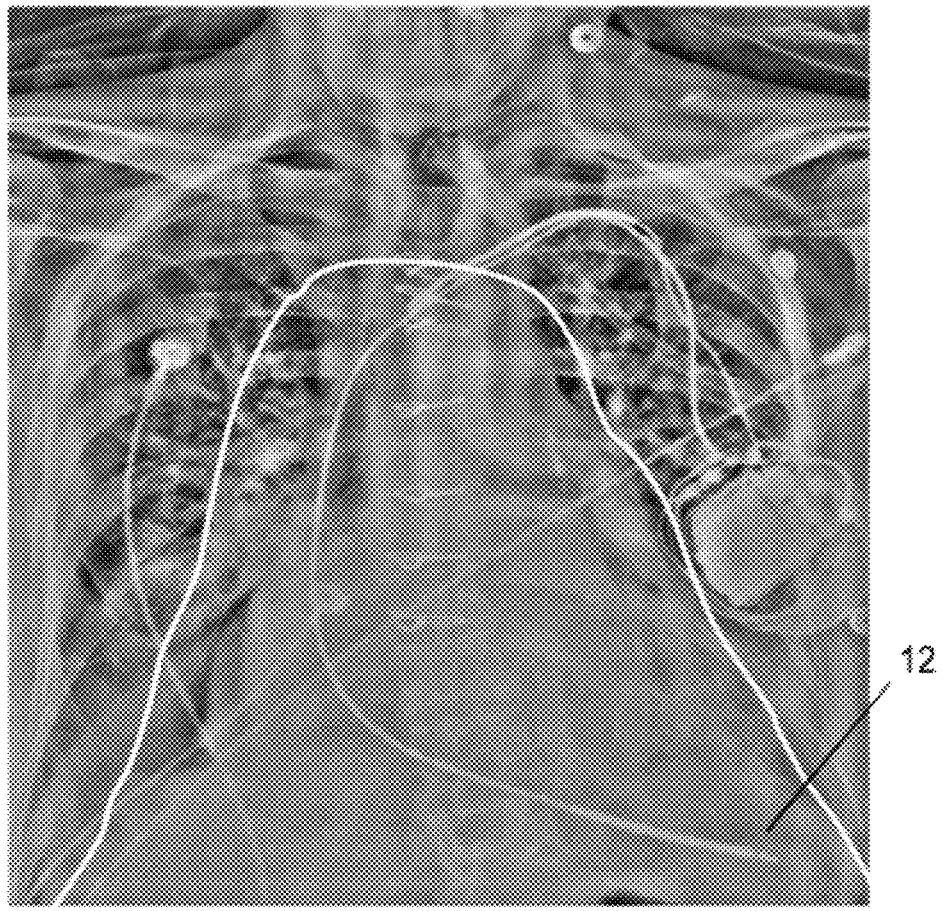
FIG. 6 shows a chest x-ray with an identified region of interest.

By way of example, the image shown in FIG. 6 shows how ROI identification step 120 isolates, from the rest of the chest x-ray image, the areas of the image that are likely to show pneumothorax. A line 12 is traced above the mediastinum and central areas of the chest, separating the image into ROI and non-ROI areas for pneumothorax detection. Identifying the region of interest can include accepting viewer instructions, such as using viewer input that outlines the ROI on a display monitor, using a computer mouse or other pointer or using a touch screen for example.

Some embodiments of the present invention apply contrast enhancement only to areas of the ROI, enhancing the visibility of features that indicate the pneumothorax condition or other condition. Advantageously, these embodiments eliminate the need for processing the full image and can be better suited to areas of higher contrast that are of interest for pneumothorax and other detection. In addition, processing only the ROI can also help to reduce image artifacts in other areas, such as the ripple artifact noted previously.

Figure 7:
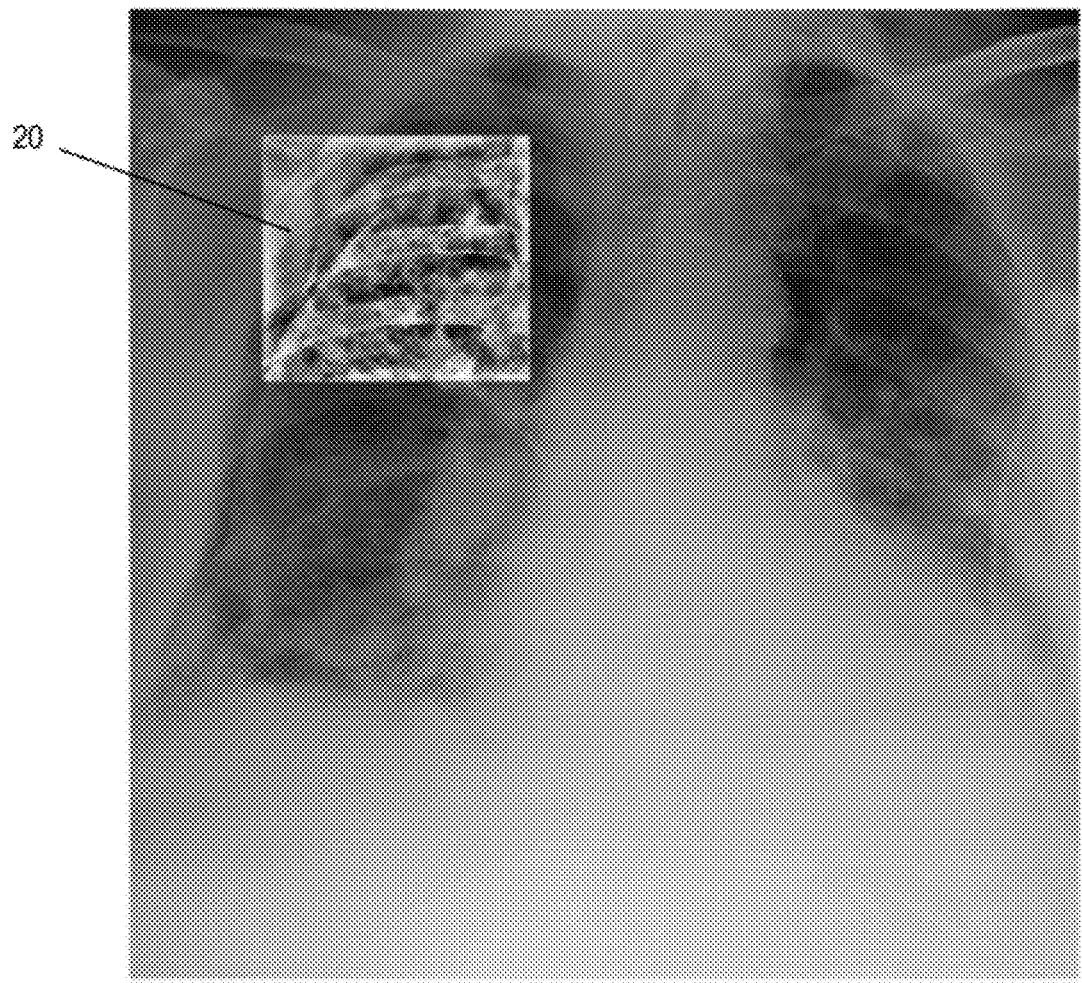
FIG. 7 shows an example with an enhanced portion of the region of interest showing pneumothorax.
Figure 8:
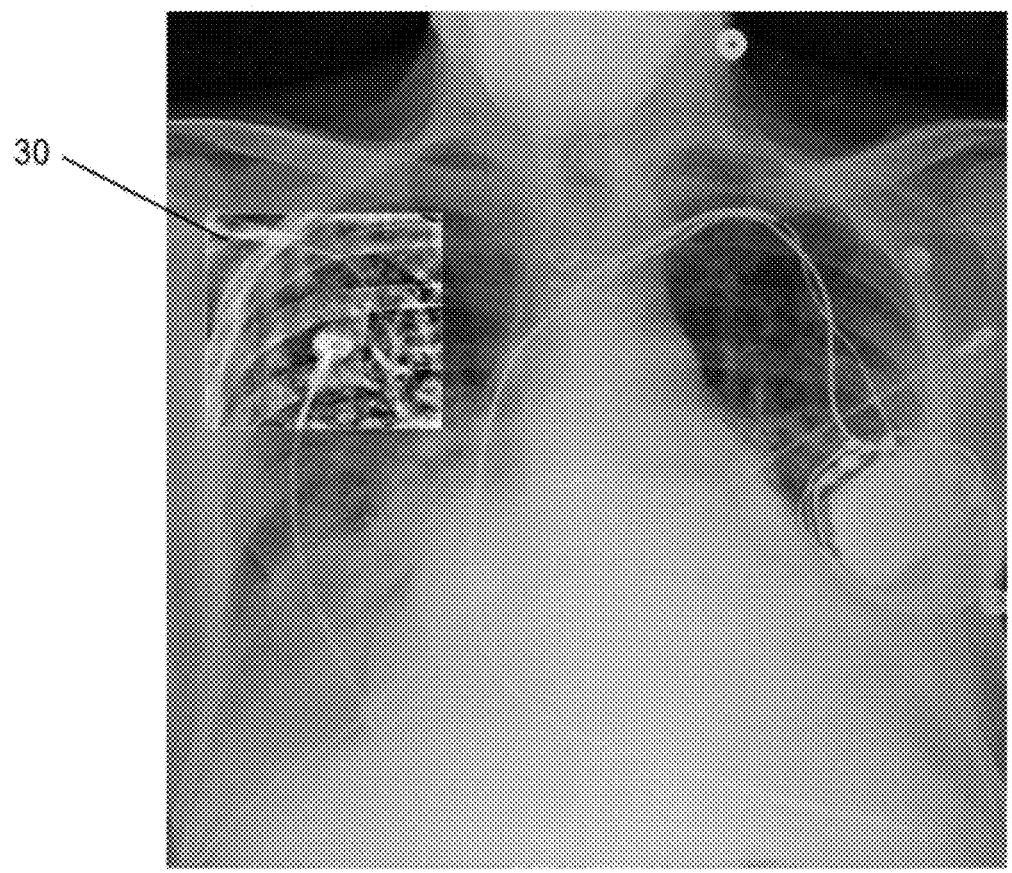
FIG. 8 shows an example with an enhanced portion of the region of interest showing pneumothorax without removal of tube and line structure.

By way of example, FIGS. 7 and 8 show example chest x-rays, each with an enhanced portion of the region of interest showing pneumothorax. It should be observed that texture differences define the pneumothorax boundary that can appear as a faint line that could otherwise easily be lost with conventional methods for line detection and suppression. Thus, care is taken in selecting suitable algorithms for processing the chest x-ray data, so that pneumothorax is visible and is not obscured.

In one embodiment, Contrast Limited Adaptive Histogram Equalization (CLAHE) is used to provide the needed detail contrast improvement for local areas within the ROI, such as for enhanced areas 20 and 30 in FIGS. 7 and 8. CLAHE is well-known to those skilled in image processing and has been used as a pre-processing technique for improving image presentation. In operation, the CLAHE method partitions an ROI into tiles or, more generally, contextual regions, then applies histogram equalization within each region accordingly.

The method described with reference to FIG. 2 provides a useful utility for pneumothorax enhancement and detection in many cases, but has some drawbacks, as has been noted. ROI detection, for example, can be inaccurate and can vary significantly from one patient to another, so that image processing results can be inconsistent and repeatable results for image enhancement difficult to achieve.

One alternative approach that does not require initial ROI identification is the use of CLAHE pre processing for the full image. However, application of CLAHE processing in this way also has drawbacks, both with raw and processed data. One known difficulty when applying CLAHE over the complete image as a pre-processing tool relates to generation of unwanted ripple in the image. The amount of ripple can vary from one image to the next, based on a number of variables that include CLAHE clipping value and tile sizing.

In general, the CLAHE clipping value/limit is proportional to the amount of contrast that is allowed. At relatively low clipping values, artifacts such as ripple may even be negligible when proper tile size is used. However, as clipping is increased in order to increase image contrast, ripple and other effects are more noticeable. Although some tile sizes work well for particular images, ripple can result at any tile size setting employed by the CLAHE algorithms. The ripple effect is more noticeable as the tile size decreases. Smaller tile size, however, generally yields better detail contrast than larger tile size.

The view given earlier in FIG. 1 shows the ripple effect as it appears in an image from raw, unprocessed image data to which CLAHE is applied in pre-processing. As can be seen, ripple artifacts are most noticeable along the vertical direction, with horizontal bands extending across the image. Some more subtle horizontal ripple artifacts are visible in image areas that lie along the sides of the rib cage. Although generally most visible over more uniform areas of the chest x-ray image, ripple may be visible within the lung area in some cases, largely depending on the contrast limit and tile size used in CLAHE application.

Over some areas of the radiographic image, attempts to increase contrast when using CLAHE processing may also tend to accentuate ripple artifacts as an unintended side effect. For this reason, global application of CLAHE algorithms to the complete image has generally involved a tradeoff between the desirable benefits of increased contrast and the negative effects of ripple artifacts.

In working with CLAHE image processing, the inventors have found that, although the selection of CLAHE parameters can affect the relative amount of ripple and related artifacts, it can be difficult to reduce ripple below visibly perceptible levels regardless of the CLAHE variables selected. The ripple effect appears to be largely a result of independent tile contrast enhancement when applying CLAHE and occurs as part of the interpolation processing that is used to minimize differences between tiles. Conventional image interpolation techniques used in CLAHE have been found to be ineffective in reducing ripple over generally uniform areas of the image. That is, adjustments made directly to the interpolation process do not appear to reduce ripple appreciably. In many cases, interpolation, which is intended to help smooth out differences between adjacent tiles in CLAHE processing, instead tends to replicate patterns that occur in adjacent tiles. The inventors have found that this behavior becomes more pronounced with selection of smaller tiles when executing CLAHE. Unfortunately, using a larger tile size can compromise image detail contrast. Thus, when using CLAHE processing directly, some amount of ripple appears to be inevitable, unless image quality is compromised by using a larger tile size.

When using CLAHE processing with suitable contrast parameters, ripple is generally not perceptible in regions of the image having significant variation in texture. At the other extreme, ripple may generally not be pronounced in areas that are wholly within very highly uniform areas of the image. The inventors have found that ripple artifacts are most visible in relatively uniform regions of the image, that is, regions of imaged anatomy that appear to be very nearly uniform when considered with respect to the overall image, but that exhibit a gradual change in intensity values, particularly where these areas of the anatomy contain tissues that present a low density to received radiation. Examples of this type of relatively uniform region for thoracic imaging include areas near the border of the mediastinum, over the heart, below the diaphragm, and areas outside of the rib cage.

Figure 9:
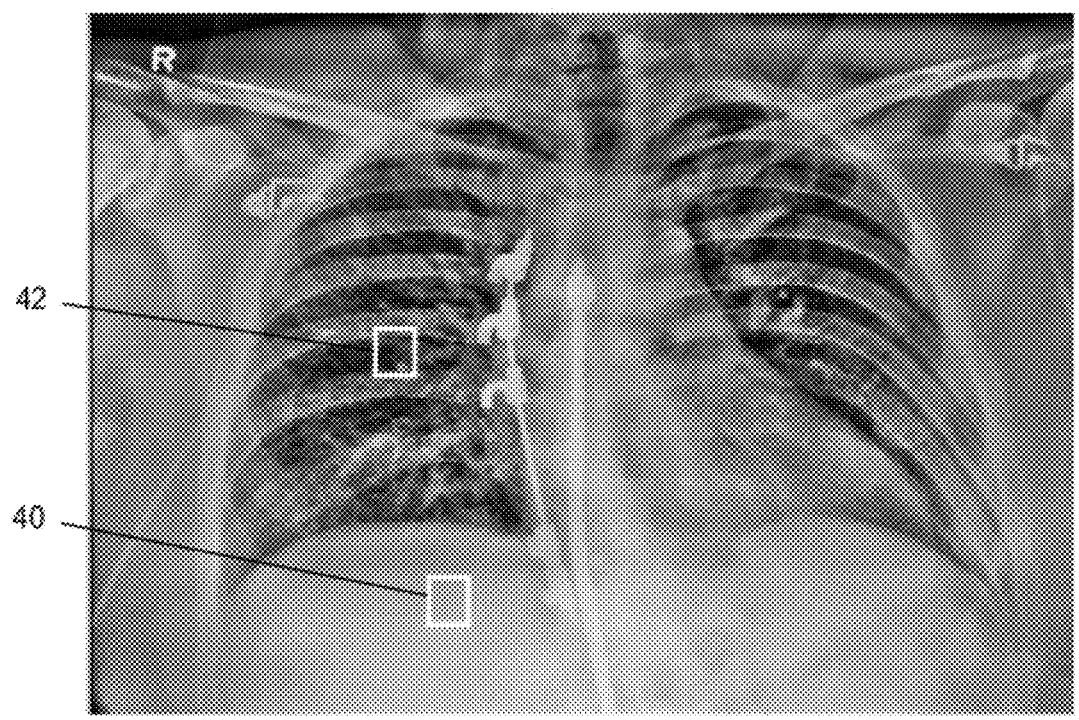
FIG. 9 shows the reduced ripple effect on a chest x-ray having relatively uniform and non-uniform regions.

FIG. 9 shows a chest x-ray having a relatively uniform region 40 and a relatively non-uniform region 42. As can be seen in this image, non-uniform region 42 has considerable detail and would benefit from increased contrast. Uniform region 40, however, employs different treatment in order to enhance contrast properly. While it may appear beneficial to apply a localized enhancement tool like CLAHE to the image of FIG. 9, the near-border areas of the more uniform region 40 are likely to cause ripple to occur in the image, even over non-bordering areas of the image.

Figure 10:
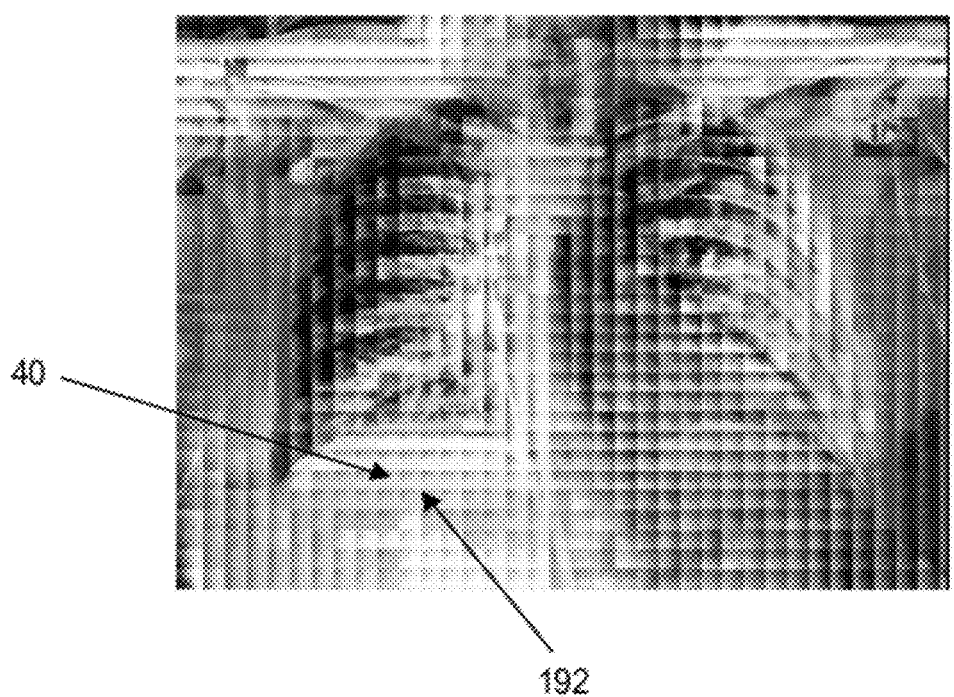
FIG. 10 shows a processing stage in which a chest x-ray is tiled as part of CLAHE processing before the interpolation process.
Figure 11:
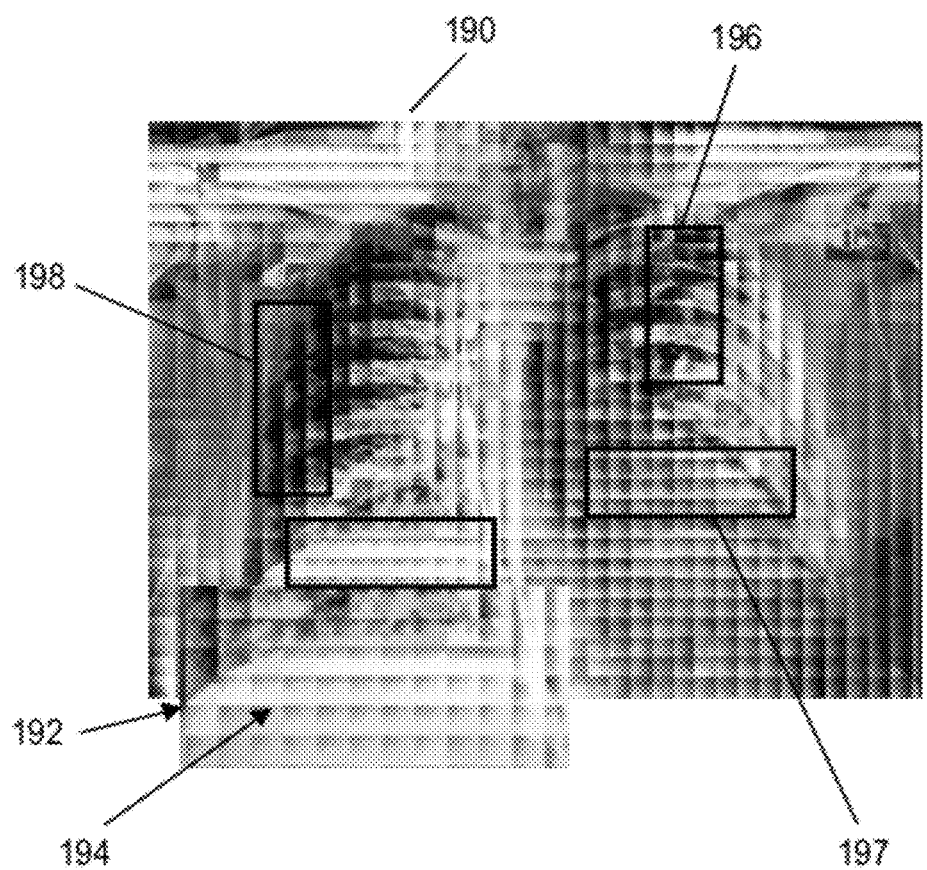
FIG. 11 shows representative processing using CLAHE techniques without using values remapping for the complete image.

FIG. 10 shows an example of the tiling that is performed for a typical chest x-ray image in CLAHE processing before interpolation. It has been found that ripple effects result from a rather "uniform" contrast treatment in relatively uniform region 40. The gradual increase in density from the border of an anatomy feature to the center of the anatomy feature creates a darker upper-left corner in each tile in abdominal region 192. In the example of FIG. 11, rows of adjacent tiles within relatively uniform region 192 exhibit a similar change in value across the tile, resulting in line patterns. Interpolation that follows tiling as part of CLAHE processing and is intended to reduce visible differences along the edges between tiles does not noticeably suppress the line patterns in a relatively uniform area such as uniform region 192 because of the similar pattern in these adjacent tiles. As a result, ripple and other related artifacts can readily occur as a result of CLAHE processing in relatively uniform areas. On the other hand, tiles in a non-uniform region 196 do not create visible line patterns before the interpolation. Less uniform areas such as a heart region 197 and lung area close to rib cage 198 also create line patterns. However, where there are larger differences between adjacent tiles, because adjacent tiles are less uniform, interpolation used in CLAHE is able to more successfully suppress the line pattern. As can be seen, there is clearly less visible ripple in these areas. Thus, one tool for reducing the ripple artifact appears to be increasing the non-uniformity of the relatively uniform regions, which in turn increase the difference among the tiles. The inventors have found that this is best done before applying interpolation and that one method for doing this is to apply a re-mapping that effectively stretches the range of data values over the image. When this is done, the slightly increased density difference between adjacent tiles helps to suppress the troublesome "line patterns" through the interpolation process that is executed with CLAHE processing.

To address the ripple effect, the inventors precede application of CLAHE with an initial re-mapping strategy that increases the difference in density, at least for areas with relatively uniform density, throughout the image in order to reduce the likelihood of ripple. This re-mapping enlarges the differences in density over at least a portion of the image. One example of this is to enlarge the range of density/pixel values over the image, prior to applying CLAHE, in either linear or non-linear manner. Following this sequence, embodiments of the present invention address the need for contrast enhancement using CLAHE processing but without added ripple artifacts or with minimum ripple effect.

A number of possible re-mapping algorithms can be used for expanding the range of the original image data prior to CLAHE processing. In one embodiment, a linear expansion or similar monotonic function is used, providing a transform that successively re-allocates each value from the original image to a corresponding value within a broader range of density values in a linear manner. In an alternate embodiment, a non-linear transform is used. A monotonic re-mapping is preferred. The re-mapping can also be used in conjunction with setting a window level and width in order to help to provide a more consistent rendering of the image, as is well known in the diagnostic imaging arts.

For re-mapping the original image data, embodiments of the present invention apply additional processing in order to condition the image, prior to contrast enhancement, by first expanding the overall range of the image data for the complete image, thus forming conditioned image data. CLAHE procedures are then used on this conditioned image data. By initially enlarging the range of values over which the CLAHE algorithm can make adjustments for contrast enhancement, embodiments of the present invention enable improved contrast to be achieved while reducing the effects caused over regions of the image that are relatively or nearly uniform, but exhibit a gradual change in intensity values.

Figure 12:
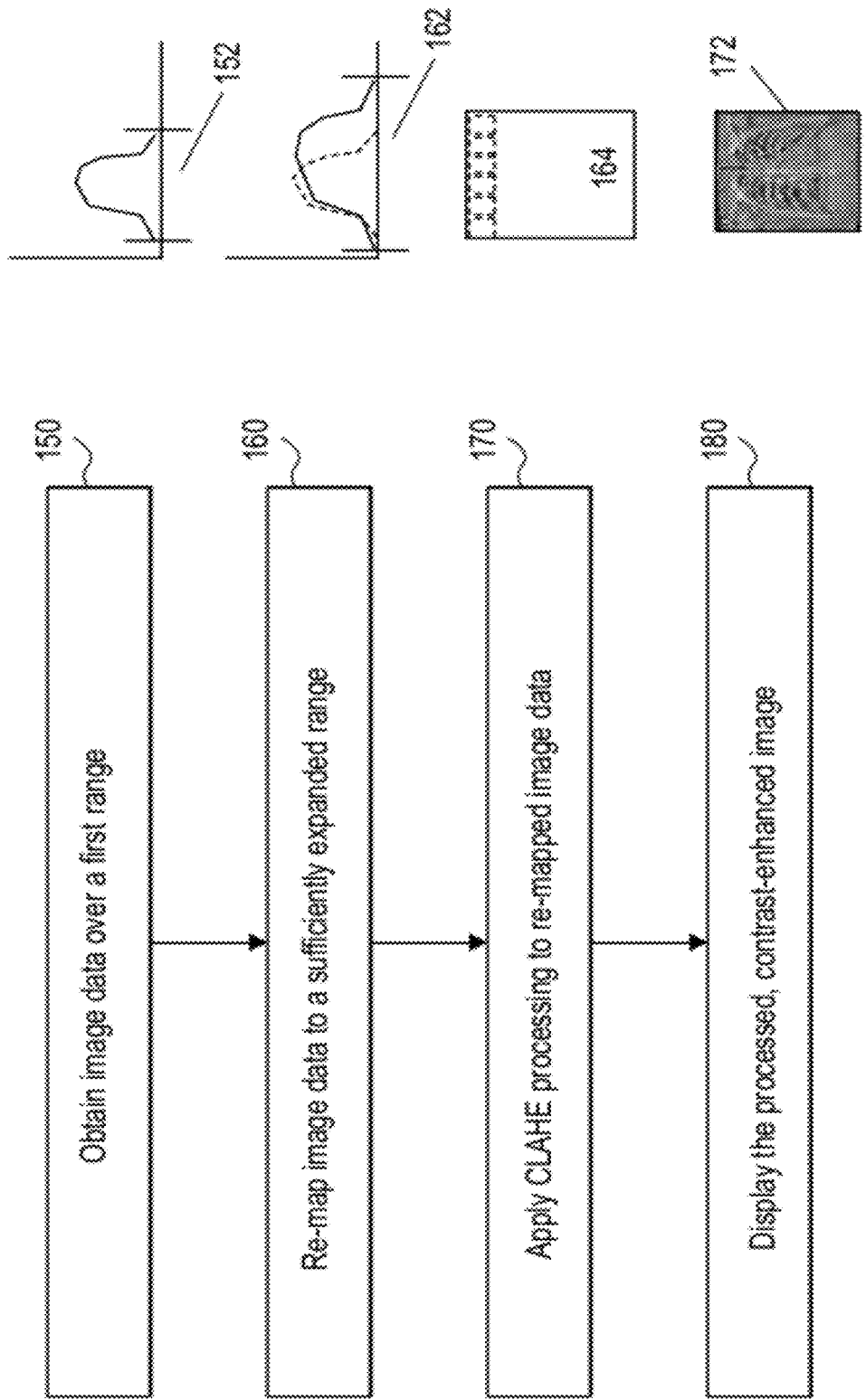
FIG. 12 is a logic flow diagram showing a processing sequence according to embodiments of the present invention.

Consistent with an embodiment of the present invention, the logic flow diagram of FIG. 12 shows basic steps in this process. An obtain image step 150 obtains the image data that may be raw (unprocessed) or processed image data. The obtained image data has an original range 152 that can vary depending on the receiver type and on exposure conditions. A re-mapping step 160 then expands range 152 to provide conditioned image data that has an expanded range 162. This forms a conditioned or expanded range image 164. A CLAHE processing step 170 then applies processing to expanded range image 164 to generate a detailed contrast-enhanced image 172. A display step 180 then displays the resulting contrast-enhanced image 172. Alternately, the generated contrast-enhanced image 172 can be stored in a memory for use by another logic process. The expansion range in step 160 should be sufficiently large depending on the combination of the tile size used and the clipping limit used. The smaller the tile size and larger the clipping value, the larger the expansion range used to reduce or eliminate perceived ripple artifacts in an area that is at least relatively uniform.

Re-mapping of image data values prior to applying CLAHE helps to reduce unwanted ripple artifacts that would otherwise result from attempts to boost image contrast using CLAHE. In addition to this improvement, embodiments of the present invention also provide a further modification to conventional CLAHE processing by generating a uniformity index that characterizes the relative texture of a contextual region of the image. CLAHE processing then uses the generated index to condition its output values. Using this added feature, enhancement can be more aggressively applied over regions having more textural variation, that is, having less uniformity. Regions that are fairly or highly uniform receive correspondingly less contrast enhancement. As is well known to those skilled in the image processing arts, the uniformity index can be generated in any number of ways, such as by applying a statistical metric to each tile, such as obtaining a standard deviation or other value. In one embodiment, for example, the uniformity index relates to a slope or curve for conditioning CLAHE output values. As another example, U.S. Pat. No. 7,400,758 entitled "Abnormal Pattern Detecting Apparatus" to Shi et al. describes a calculation method for determining a uniformity index for an image.

Figure 13:
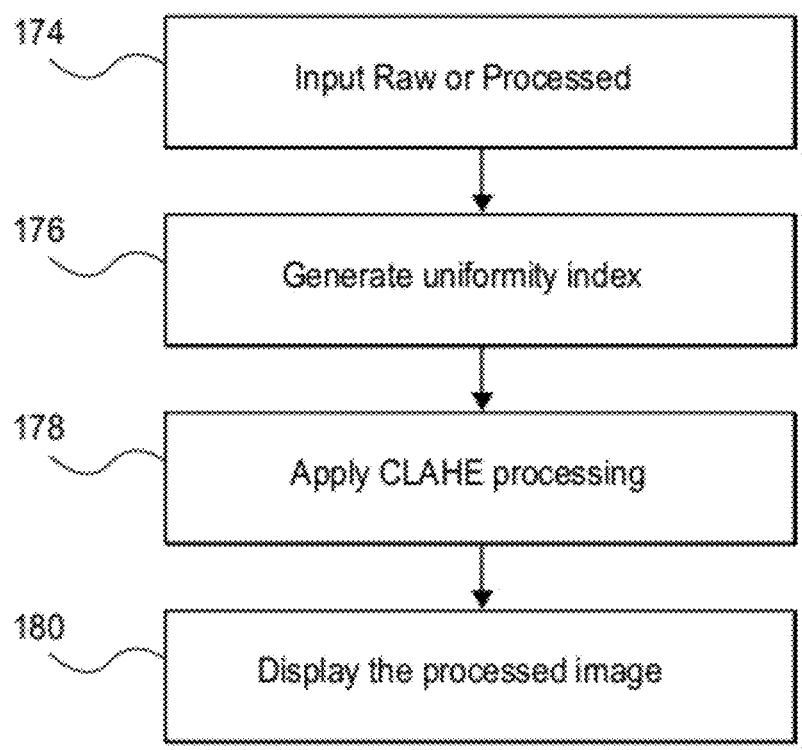
FIG. 13 is a logic flow diagram showing a processing sequence generating a uniformity index map followed by CLAHE processing according to embodiments of the present invention.

The logic flow diagram of FIG. 13 shows a sequence for modification of CLAHE processing based on local uniformity of an image area. With respect to the process shown in FIG. 12, the sequence of FIG. 13 would execute following re-mapping step 160. In an input step 174, the raw or processed data is obtained. A uniformity index generation step 176 then defines one or more contextual regions within the image, which regions may or may not be non-overlapping, and analyzes image texture within each contextual region to generate a corresponding uniformity index that provides a quantification of texture for the imaged subject. A CLAHE processing step 178 then applies CLAHE algorithms using the uniformity index information to condition the CLAHE process. The resulting image is then presented on a display monitor in display step 180.

Using the processing sequence of FIG. 12 helps to provide images having improved image contrast and with ripple artifacts noticeably reduced or eliminated. Careful choice of the clipping limit used in FIG. 12 should be considered because larger differences in contrast enhancement can be perceived as blurring artifacts in the lower contrast-enhanced regions.

Figures 14A, 14B:
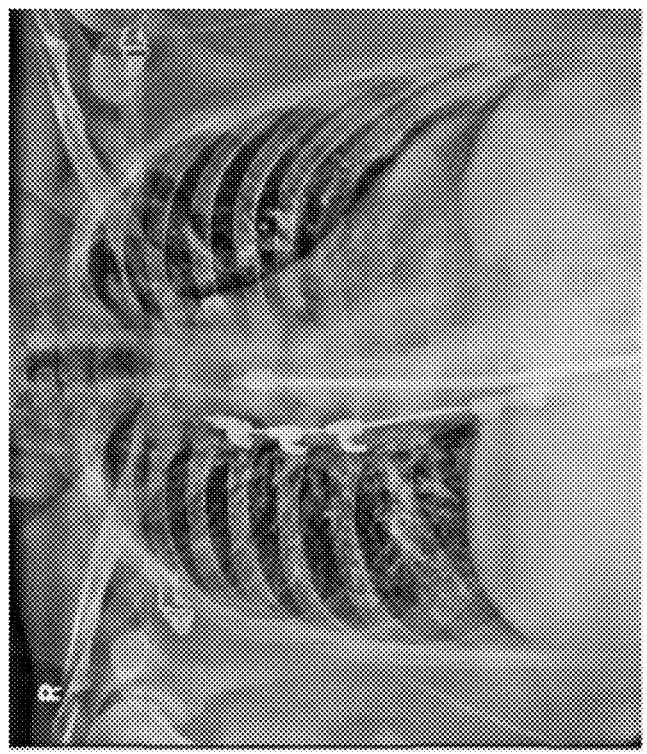
FIG. 14A shows exemplary contrast enhancement results without using values remapping.
FIG. 14B shows exemplary contrast enhancement results when using values remapping according to embodiments of the present invention.

By way of example, FIG. 11 shows results of tile processing for a tiled image 190 that has not been pre-processed. That is, the image of FIG. 11 simply applies CLAHE processing to raw image data, without using the initial remapping step 160 of FIG. 12. This causes a patterning across adjacent tiles in this area. Although the subsequent interpolation smoothes out the tile edge as intended, it can be appreciated that the interpolation steps of CLAHE processing cannot correct for this patterning, so that ripple inevitably results in the output image, as shown in the example of FIG. 14A. By contrast, FIG. 14B shows the improvement that results when using the processing steps of FIG. 12, with re-mapping step 160 executed prior to CLAHE. Ripple is substantially reduced or eliminated, along with contrast improvement.

Unlike other image processing sequences that utilize CLAHE as a preprocessing step for contrast enhancement, embodiments of the present invention first re-map image values to an expanded range before executing CLAHE. This sequence has been found to reduce ripple effects and other artifacts while achieving desirable contrast. Advantageously, the method of the present invention can be applied either to raw image data or to processed image data, helping to highlight and identify pneumothorax and other clinical and diagnostic conditions of interest by analyzing image appearance. The method of the present invention is particularly advantageous for images such as chest x-ray images in which a portion of the image has a significant amount of detail, while other parts of the image may be highly uniform by comparison.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for enhancing a radiographic image, executed at least in part on a processor, comprising:
   obtaining image data for the radiographic image;
   generating conditioned image data by increasing differences between portions of at least a relatively uniform area of the radiographic image;

generating an enhanced image by applying contrast limited adaptive histogram equalization to the conditioned image data;

applying interpolation to the enhanced image; and displaying, storing, or transmitting the enhanced image.

2. The method of claim 1 wherein generating conditioned image data comprises re-mapping at least a portion of the obtained image data values to an expanded range of data values.

3. The method of claim 1 wherein the portions are neighboring portions, and wherein generating conditioned image data comprises applying a randomization to the neighboring portions of at least the uniform area.

4. The method of claim 1 wherein the portions are neighboring portions, and wherein increasing differences between neighboring portions of at least the uniform area comprises setting different clipping values for the neighboring portions for the contrast limited adaptive histogram equalization.

5. A method for enhancing a radiographic image, executed at least in part on a processor, comprising:

obtaining image data for the radiographic image, wherein the image data values extend within a first range;

generating conditioned image data by re-mapping at least a portion of the obtained image data values to a second range that is expanded over the first range;

generating an enhanced image by applying contrast limited adaptive histogram equalization to the conditioned image data; and displaying, storing, or transmitting the enhanced image.

6. The method of claim 5 wherein the re-mapping is either (1) a linear re-mapping or (2) a non-linear, monotonic re-mapping.

7. The method of claim 5 wherein generating conditioned image data further comprises one of the following: (1) identifying and suppressing one or more tube lines or line structures, (2) identifying and suppressing rib structures, or (3) identifying a region of interest in the radiographic image.

8. The method of claim 5 wherein the obtained image data is either pre-processed or unprocessed raw data.

9. The method of claim 5 wherein generating the enhanced image further comprises:

defining a plurality of regions within the image;

generating a uniformity index for each of the regions in the defined plurality of regions, wherein the value of the uniformity index relates to the relative texture of the image content in the region; and applying contrast limited adaptive histogram equalization to each region according to its corresponding generated uniformity index.

10. The method of claim 5 wherein re-mapping comprises using a histogram equalization process.

11. A method for enhancing a radiographic image, executed at least in part on a processor, comprising:

obtaining image data for the radiographic image;

identifying a region of interest within the radiographic image, wherein image data values within the region of interest extend within a first range;

generating conditioned image data by re-mapping at least the obtained image data values within the region of interest to a second range that provides increased density over the first range;

generating an enhanced image by enhancing image contrast within at least the region of interest of the conditioned image data using contrast limited adaptive histogram equalization; and displaying, storing, or transmitting the enhanced image.

12. The method of claim 11 wherein identifying the region of interest comprises accepting viewer instructions.

13. The method of claim 11 wherein generating conditioned image data further comprises identifying and suppressing one or more tube or line structures.

14. The method of claim 11 wherein generating conditioned image data further comprises identifying and suppressing rib structures.

15. The method of claim 11 wherein the obtained image data is pre-processed.

16. The method of claim 11 wherein the obtained image data is unprocessed raw data.

17. A method for enhancing a radiographic image, executed at least in part on a processor, comprising:

obtaining image data for the radiographic image, wherein the image data values extend over a first range;

conditioning the image by re-mapping the obtained image data values to an expanded range;

enhancing image contrast of the conditioned image by defining a plurality of regions within the conditioned image;

generating a uniformity index for each of the defined regions, wherein the value of the uniformity index relates to the relative texture of the image content within the region;

generating an enhanced image by applying contrast limited adaptive histogram equalization to each defined region according to its corresponding generated uniformity index; and displaying, storing, or transmitting the enhanced image.

18. The method of claim 17 wherein re-mapping increases the difference in density of the obtained image data values.

19. The method of claim 17 wherein the re-mapping is a monotonic-function re-mapping.

* * * * *